RECORD SUPPORTING SPINDLES FOR RECORD CHANGING GRAMOPHONES

Filed March 15, 1955 2 Sheets-Sheet 1

INVENTOR
Walter Frederick Manning
By David M. ... his atty

RECORD SUPPORTING SPINDLES FOR RECORD CHANGING GRAMOPHONES

Filed March 15, 1955 2 Sheets-Sheet 2

INVENTOR
Walter Frederick Manning
By David Moran
his atty.

United States Patent Office 2,873,977

Patented Feb. 17, 1959

2,873,977

RECORD SUPPORTING SPINDLES FOR RECORD CHANGING GRAMOPHONES

Walter Frederick Manning, Swindon, England, assignor to The Garrard Engineering and Manufacturing Company Limited, Swindon, England Application March 15, 1955, Serial No. 494,380

Claims priority, application Great Britain March 23, 1954

3 Claims. (Cl. 274—10)

Figures 1, 2:
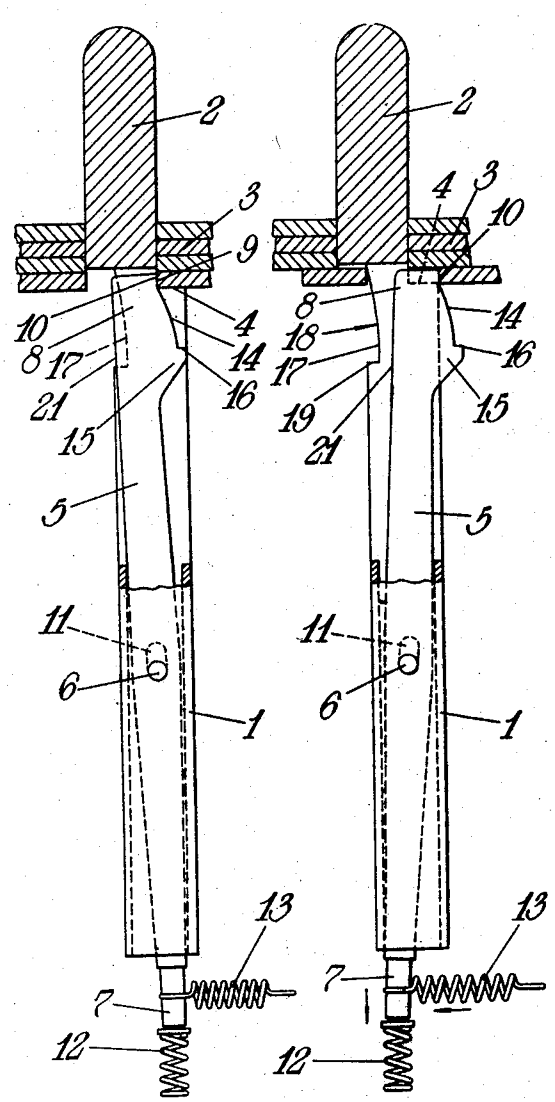

This invention relates to record supporting spindles for record changing gramophones of the type utilizing a vertically upstanding small diameter spindle on which the records to be played are stacked horizontally and which incorporates mechanism for dropping records successively on to the gramophone turntable for playing.

In the case of known spindles of the type indicated, in which the mechanism for effecting dropping of the records operates on the interior face of the central hole of the record, the stacking and playing of records of mixed sizes, e. g. 12 inch and 10 inch, is precluded, since the size of each of the records comprising the stack is not determinable at the central hole and in sufficient space (only the thickness of a record) is available to allow for the use of a swing-in detector to gauge the record diameter as the record is about to be dropped.

The object of the present invention is to provide a record supporting spindle for record changing gramophones of the type indicated which permits the stacking and successive playing of records of mixed sizes and overcomes the disadvantages heretofore involved as set out in the preceding paragraph.

The invention consists in a record supporting spindle for record changing gramophones of the type indicated having means associated therewith for temporarily arresting a record, being dropped to the turntable, at a position intermediate the stacking level and the level of the turntable so that its diameter size can be gauged by peripheral size detector means while the record is clear of the stack and before it reaches the turntable.

The invention further consists in a record supporting spindle for record changing gramophones of the type indicated wherein the records are stacked on a shoulder comprising an initial dropping station which is occupied by the lowest or last record of the stack prior to delivery to the turntable and a secondary dropping station is provided at a point spaced below the initial dropping station, whereat the record about to be played is arrested for a period sufficient to permit peripheral gauging of the record size. By this arrangement the record about to be played can be gauged as to size when supported clear of the main stack of records, whereafter it is finally dropped, the swing of the pick-up arm having been correctly preset as a result of the gauging operation.

The invention still further consists in a record supporting spindle, according to the preceding paragraph, wherein the secondary dropping station is eccentrically located with respect to the axis of the spindle in the direction of the point of contact of a size gauging member with the record periphery.

The invention still further consists in a record supporting spindle, according to the preceding paragraphs, and having a vertical off-set upper portion providing a shoulder on which a record or stack of records can be supported and a pivotally mounted thrustor member within the spindle operable to dislodge a record from said shoulder for dropping purposes, wherein the secondary dropping station is formed in part by shoulder means on the thrustor member and in part by secondary shoulder means on the spindle.

The invention still further consists in a record supporting spindle, according to the preceding paragraph, wherein the secondary dropping station is formed by a shoulder projection on the thrustor member which is normally housed within the spindle periphery and a second shoulder on the spindle lying within the periphery of the spindle, which is normally blanked off by a vertical portion of the thrustor member, the thrustor member being provided above the projection thereon with an outwardly curving cam face adapted to guide a dropping record past the centre line of the spindle so that it engages said second shoulder and lies eccentric to the spindle axis.

In the accompanying drawings:

Figures 1 to 4 show one form of the record supporting spindle, according to the present invention, in various steps of operation.

In carrying the invention into effect according to one convenient mode by way of example the centre stacking spindle comprises a cylindrical portion 1 adapted to be received in the centre hole of the gramophone turntable (not shown) and project upwardly therefrom in known manner, terminating in an offset top portion 2 on which a stack 3 of records to be played may be placed, the offsetting of the top portion providing a shoulder 4 on which the records are sustained with the assistance of a stabilizing arm (not shown), provided in known manner elsewhere on the gramophone base plate.

The successive dropping of records from their supported position on the shoulder 4 is accomplished by means of a thrustor member 5 contained within the lower half of the spindle and pivoted thereto at 6 such that control movements applied to the lower end 7 of the thrustor member 5, beneath the turntable, result in a radial movement of the upper end 8 of the thrustor member 5 across and above the plane of the shoulder 4 so that a record, or the lowermost record of the stack 3, is engaged on the annular face 9 of its central hole by a striking face 10 on the thrustor member end 8 and caused to be slid off the shoulder 4 (see Figure 2) so that normally it can slide down the spindle 1 on to the turntable.

The pivoting of the thrustor member 5 within the lower portion 1 of the spindle is through a slot 11 in the thrustor member to allow limited movement of the thrustor member axially of the spindle so that when a record is displaced off the shoulder 4 any remaining records bear on the top of the thrustor member end 8 and depress the thrustor member until they are sustained by the shoulder 4 (see Figure 3), whereby the thrustor member can pivot back to its normal position relatively freely and without having to bear the weight of the superposed records. For this reason the thrustor member 5 is provided with resilient spring means 12 at its base 7 acting axially thereof to bias the thrustor member upwardly so that when it returns to its position fully within the spindle and clear of the stack of records, the thrustor member can rise to be in position for displacing the next record (see Figures 1 and 4).

The thrustor member 5 is also provided with a further spring loading 13 to cause it to be biassed, as regards rotation about its pivot 6, to return to and normally occupy its position within the spindle, the control means (not shown) which actuate the thrustor member working against the further spring loading 13.

The above description relates to a known form of centre change spindle wherein the records are either stacked on the spindle shoulder or are on the turntable after a rapid and uninterrupted descent down the spindle. With such an arrangement it is most difficult if not impossible to devise means for reliably detecting the size, i. e. diameter, of the records as they are about to be played, if it is desired to play records of mixed size. This is due to the fact that when stacked on the shoulder 4 of the spindle only the thickness of a record is available for touch contact of a swinging arm type record size detector.

The present invention, now to be described, provides a way of overcoming this disadvantage and permitting record size detection so that mixed size records can be played.

The improved spindle construction is a modification of the normal spindle construction described above and has the same basic features and mode of operations. The thrustor member 5 is, however, formed with an outwardly curving cam surface 14 terminating in a projection 15 affording an upwardly facing shoulder 16 spaced approximately ⅜ inch below the record stacking shoulder 4 of the spindle. The cam surface 14 and lower shoulder projection 15 are normally housed within the spindle when the thrustor member 5 is in its retracted position (see Figure 1 or 4), but project radially from the side of the spindle during a record changing movement of the thrustor member (see Figures 2 and 3). On the opposite side of the spindle to that from which the cam surface 14 and shoulder 15 can project, the spindle is cut away in a downwardly progressively deepening recess 17 (see Figure 2), the back surface 18 of which corresponds in profile with the curve of the cam surface 14 of the thrustor member on the opposite side of the spindle when the cam surface is projecting from the spindle, and corresponds in horizontal section with the curvature of the centre hole of a record, the arrangement being such that when a record is pushed off the main stacking shoulder 4 of the spindle it is displaced laterally (see Figures 2 and 3) so as to become eccentric with the spindle axis by sliding down the curved face of the cam surface 14, which it is permitted to do by the recess 17 formed in the spindle on the opposite side.

The dropping record is arrested at the end of the cam surface 14 by the shoulder 16 and is temporarily supported thereon and on a cooperating shoulder 19 on the opposite side of the spindle marking the lowermost end of the recess 17 in the spindle. The co-operating shoulder 19 is level with the shoulder of the thrustor member 5, when the latter has been depressed as described above by the weight of the record or stack of records (see Figure 3).

Figures 3, 4:
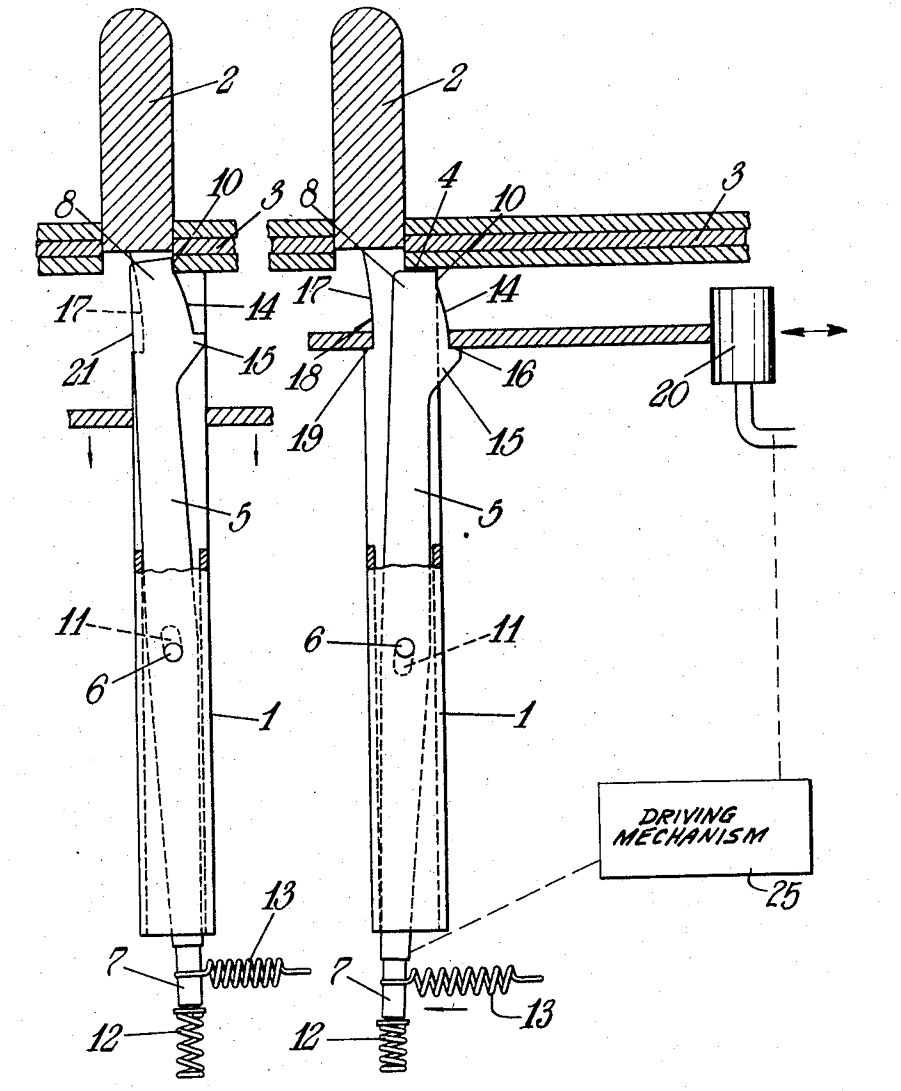

In this way a record is temporarily arrested in its descent to the turntable for a sufficient time and in a suitable position for a detector member or selector of the swinging-arm type indicated at 20 in Figure 3 to contact the record periphery and gauge its diameter size. As soon as this has been accomplished, the driving mechanism 25 shown schematically in Fig. 3 as operating the thrustor member and the selector, functions to pivot it back and retract it into the spindle (see Figure 4) so withdrawing the shoulder 16 from beneath the record and causing spindle recess 17 to be blanked off by the side portion 21 of the thrustor member effectively to eliminate the co-operating shoulder 19. The record, being again concentric with the spindle and no longer supported, then completes its descent to the turntable as shown in Figure 4.

Alternatively, but not illustrated, the axial spring movement of the thrustor member as a whole described above can be dispensed with, and the desired effect achieved by making the thrustor member in two parts, the upper part above the shoulder projection 15 being axially movable with respect to the lower part by a pin and slot connection and a spring being provided to urge the upper part upwardly. By this arrangement the desired resilient limited movement of the tip 8 of the thrustor member can be obtained while allowing the height of the shoulder 16 of the thrustor member to be at all times on the same level as the co-operating shoulder 19 on the spindle.

What is claimed is:

1. In a record changer: a vertical offset spindle having a record shelf between its upper and lower ends and a slot therein extending below said shelf; a lever pivotally mounted in said slot and having a head portion extending above said shelf into the offset portion of the spindle for engagement in the spindle hole of a record supported on said shelf; a ledge on said lever at a distance below said shelf, in all positions of said lever, equal to a multiple of the thickness of a record, said ledge being normally within said slot; record size determining means movable laterally toward said spindle at the general level of said ledge and in vertically spaced relation to the under-surface of a record supported on said shelf; and driving mechanism conjointing operating said lever and record size determining means during a record changing sequence; said lever, during a record changing sequence, pivoting to move its head portion laterally and said ledge out of said slot to displace the lowermost record laterally from said shelf and support the next record on its head portion, the lowermost record dropping onto said ledge and being peripherally contacted by the record size determining means moving laterally toward said spindle; said lever then pivoting in the opposite direction to retract said ledge into said slot to release such lowermost record to drop onto a turntable and to release such next record to drop onto said shelf.

2. In a record changer as claimed in claim 1 in which said lever has a pivotal connection in said spindle providing for limited vertical movement of said lever relative to said spindle, said lever moving downwardly when such next record is supported on the lever head portion; and a second ledge on said spindle horizontally aligned with the first ledge when said lever moves downwardly; said ledges conjointly supporting said lowermost record.

3. In a record changer as claimed in claim 2 in which said lever has an outward convex surface extending from its head portion to said first-named ledge, and said spindle has an outwardly concave surface extending to said second ledge and opposite said convex surface; said convex and concave surfaces being laterally spaced by a distance of the order of the diameter of the record spindle hole, and conjointly guiding said lowermost record laterally toward said record size determining means.

References Cited in the file of this patent

UNITED STATES PATENTS

| | | |
|---|---|---|
| 2,512,121 | Thevenaz | June 20, 1950 |
| 2,621,932 | Knox | Dec. 16, 1952 |
| 2,641,474 | Zandelin | June 9, 1953 |
| 2,643,127 | Gregg et al. | June 23, 1953 |

FOREIGN PATENTS

| | | |
|---|---|---|
| 68,487 | Norway | Oct. 23, 1944 |
| 849,014 | Germany | Sept. 11, 1952 |